(12) United States Patent
Rizk et al.

(10) Patent No.: US 8,960,629 B2
(45) Date of Patent: Feb. 24, 2015

(54) REARVIEW MOUNTING DEVICE

(71) Applicant: Gentex Corporation, Zeeland, MI (US)

(72) Inventors: Peter N. Rizk, Holland, MI (US);
Kenton J. Ypma, Hudsonville, MI (US);
Kenneth R. Filipiak, West Olive, MI (US)

(73) Assignee: Gentex Corporation, Zeeland, MI (US)

( * ) Notice: Subject to any disclaimer, the term of this patent is extended or adjusted under 35 U.S.C. 154(b) by 9 days.

(21) Appl. No.: 13/800,180

(22) Filed: Mar. 13, 2013

(65) Prior Publication Data

US 2014/0097320 A1   Apr. 10, 2014

Related U.S. Application Data

(60) Provisional application No. 61/709,716, filed on Oct. 4, 2012.

(51) Int. Cl.
*A47G 1/24* (2006.01)
*B60R 1/04* (2006.01)
*F16M 11/14* (2006.01)
*F16M 13/02* (2006.01)

(52) U.S. Cl.
CPC .............. *B60R 1/04* (2013.01); *F16M 11/14* (2013.01); *F16M 13/02* (2013.01); *F16M 2200/021* (2013.01); *F16M 2200/022* (2013.01); *F16M 2200/024* (2013.01); *F16M 2200/041* (2013.01)
USPC ........................................................ 248/481

(58) Field of Classification Search
USPC ............ 403/90, 124, 125, 126, 128; 359/872; 362/494; 248/481, 549
See application file for complete search history.

(56) References Cited

U.S. PATENT DOCUMENTS

| | | | |
|---|---|---|---|
| 596,207 A * | 12/1897 | Hart | 403/90 |
| 892,105 A * | 6/1908 | White | 248/60 |
| 1,800,797 A | 4/1931 | Hoople | |
| 2,210,147 A | 8/1940 | Griffith | |
| 2,256,763 A | 9/1941 | Reed | |
| 2,643,084 A | 6/1953 | Reed | |
| 3,575,375 A | 4/1971 | Strem, Jr. | |
| 3,644,021 A | 2/1972 | Hamby | |
| 4,244,548 A | 1/1981 | Sharp | |
| 4,435,042 A | 3/1984 | Wood et al. | |

(Continued)

FOREIGN PATENT DOCUMENTS

CN   2905552   5/2007
SU   1341081   9/1987

OTHER PUBLICATIONS

Patent Cooperation Treaty, International Searching Authority, International Search Report, Written Opinion of the International Searching Authority and Notification of Transmittal, Dec. 19, 2013 6 Pages.

*Primary Examiner* — Bradley Duckworth
(74) *Attorney, Agent, or Firm* — Price Heneveld LLP; Scott P. Ryan

(57) ABSTRACT

A rearview device mounting assembly includes a bracket having a windshield engagement surface. The bracket further includes a neck with a ball. The ball has at least one of either a knurled patch or a striation and the ball is configured to engage a socket in the rearview device. The socket of the rearview device includes fingerlike projections and a ball engaging surface. The ball engaging surface has raised features to frictionally engage the ball and minimize or eliminate droop of the rearview device.

5 Claims, 26 Drawing Sheets

(56) References Cited

U.S. PATENT DOCUMENTS

| | | | |
|---|---|---|---|
| 4,436,372 A | 3/1984 | Schmidt et al. | |
| 4,520,983 A | 6/1985 | Templeman | |
| 5,100,093 A | 3/1992 | Rawlinson | |
| 5,106,177 A | 4/1992 | Dolasia | |
| 5,487,522 A | 1/1996 | Hook | |
| 5,588,767 A * | 12/1996 | Merlo | 403/128 |
| 5,615,857 A | 4/1997 | Hook | |
| 5,946,150 A * | 8/1999 | Liao | 359/871 |
| 5,949,593 A | 9/1999 | Lloyd | |
| 6,109,815 A * | 8/2000 | Merlo | 403/90 |
| 6,217,249 B1 * | 4/2001 | Merlo | 403/90 |
| 6,467,919 B1 | 10/2002 | Rumsey et al. | |
| 6,494,635 B1 * | 12/2002 | Merlo | 403/90 |
| 6,651,347 B2 * | 11/2003 | Uhl | 30/383 |
| 6,702,502 B1 * | 3/2004 | Graber et al. | 403/34 |
| 6,767,153 B1 * | 7/2004 | Holbrook | 403/56 |
| 6,877,709 B2 | 4/2005 | March et al. | |
| 7,017,880 B2 | 3/2006 | Swain | |
| 7,025,315 B2 * | 4/2006 | Carnevali | 248/276.1 |
| 7,125,130 B2 | 10/2006 | Xiao | |
| 7,155,027 B2 * | 12/2006 | Lee | 381/390 |
| 7,156,358 B2 | 1/2007 | March et al. | |
| 7,264,217 B2 | 9/2007 | DeLine | |
| 7,287,868 B2 * | 10/2007 | Carter et al. | 359/871 |
| 8,061,921 B2 * | 11/2011 | Seol et al. | 403/124 |
| 2004/0207940 A1 * | 10/2004 | Carter et al. | 359/879 |
| 2005/0036328 A1 * | 2/2005 | Walser et al. | 362/494 |
| 2005/0174663 A1 * | 8/2005 | Carter et al. | 359/879 |
| 2007/0012840 A1 * | 1/2007 | Kalis et al. | 248/288.31 |
| 2007/0096005 A1 * | 5/2007 | March et al. | 248/549 |
| 2010/0277821 A1 * | 11/2010 | Roth et al. | 359/872 |
| 2011/0305504 A1 * | 12/2011 | Yu et al. | 403/124 |

* cited by examiner

REARVIEW MOUNTING DEVICE

CROSS-REFERENCE TO RELATED APPLICATION

This application claims the benefit of and priority to U.S. Provisional Patent Application No. 61/709,716, filed on Oct. 4, 2012, entitled "REARVIEW MOUNTING DEVICE," the entire disclosure of which is hereby incorporated herein by reference.

BACKGROUND OF THE INVENTION

The present invention generally relates to a mount system for a vehicle, and more specifically a ball and socket mount for a rearview device.

SUMMARY OF THE PRESENT INVENTION

One aspect of the present invention includes rearview mounting device assembly, having a mount and a neck extending from the mount and including a ball on a distal end thereof. At least one striation or a striation or a knurled patch is disposed on an outer circumference of the ball. A socket is configured to closely receive the ball.

In another aspect, the present invention includes a rearview device assembly, including a rearview device and a socket extending from the rearview device. The socket has fingerlike projections to closely receive a ball. The socket also has a ball engagement surface with raised features thereon to frictionally engage the ball.

In another aspect, the present invention includes a rearview device mounting assembly, including a socket having a ball engaging surface and a ball having an exterior surface which fits in close engagement with the ball engaging surface. At least one of the ball or the socket has rotation resistance increasing features. The rotation resistance increasing features include a textured ball engaging surface or a textured exterior surface.

These and other aspects, objects, and features of the present invention will be understood and appreciated by those skilled in the art upon studying the following specification, claims, and drawings.

DETAILED DESCRIPTION OF EMBODIMENTS

Figure 1:
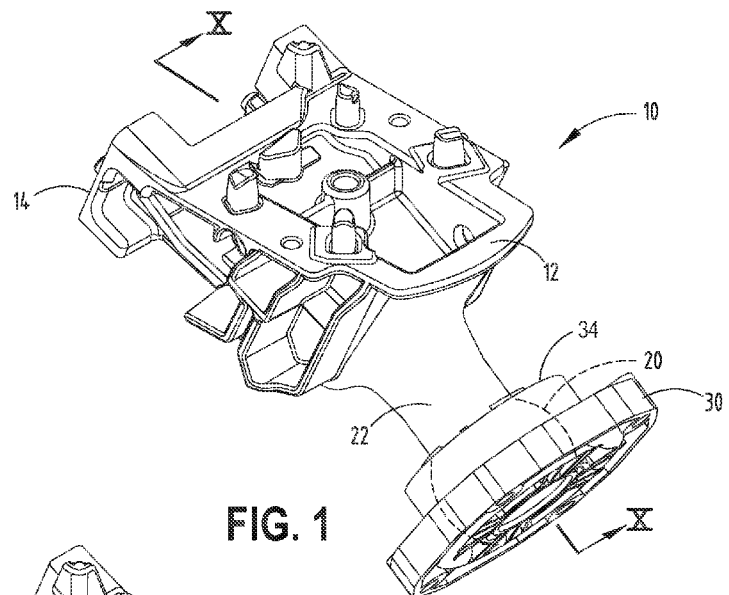
FIG. 1 is a top perspective view of one embodiment of a ball portion of a mounting assembly of a rearview device.
Figure 1A:
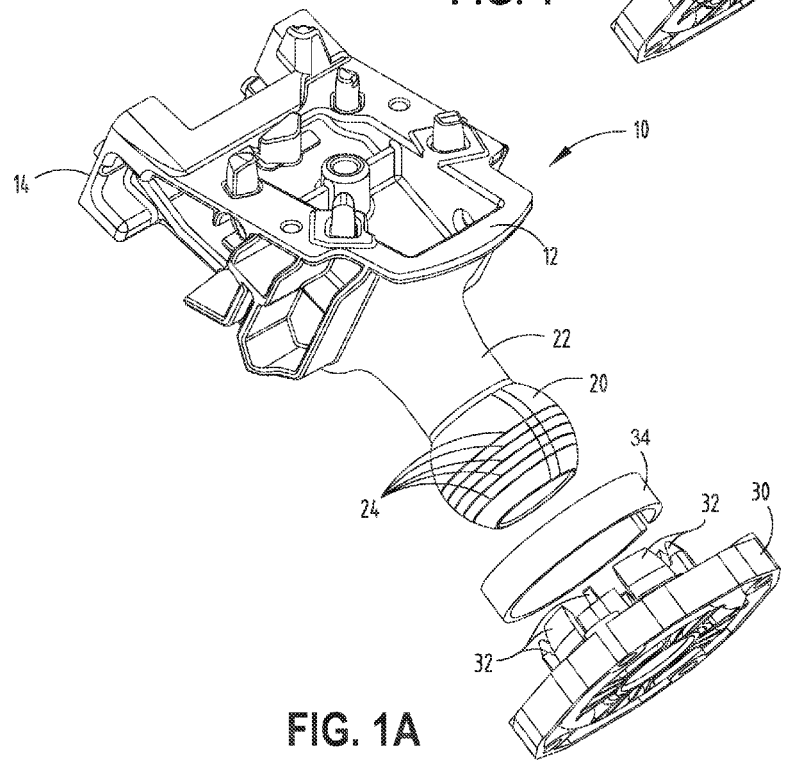
FIG. 1A is a top perspective exploded view of the mounting assembly of FIG. 1.
Figure 2:
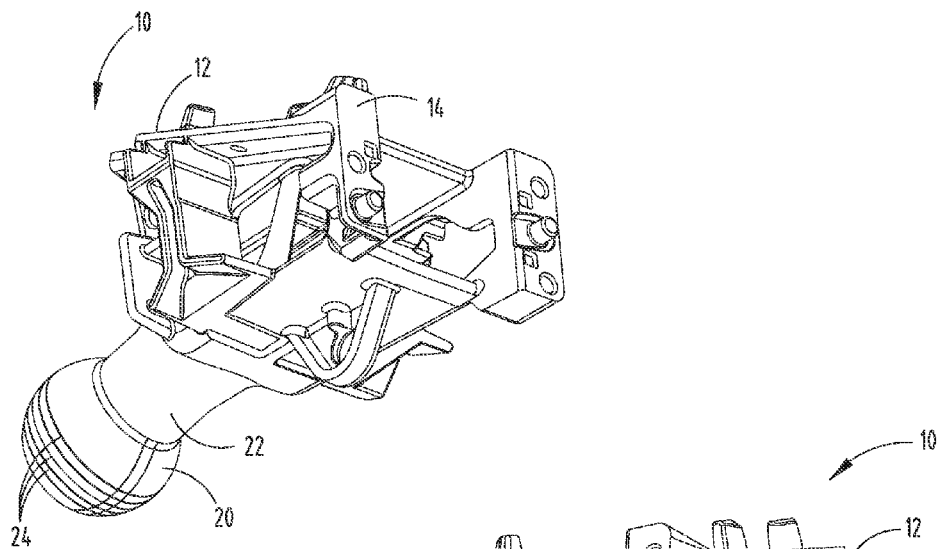
FIG. 2 is a first side bottom perspective view of the mounting assembly of FIG. 1.
Figure 2A:
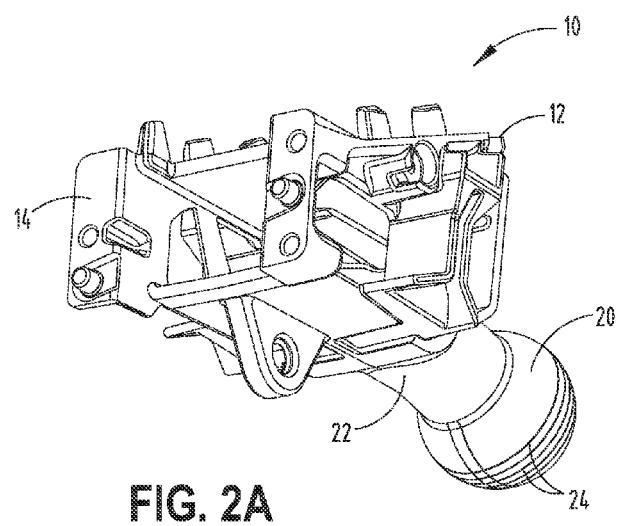
FIG. 2A is a second side bottom perspective view of the mounting assembly of FIG. 1.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 6:
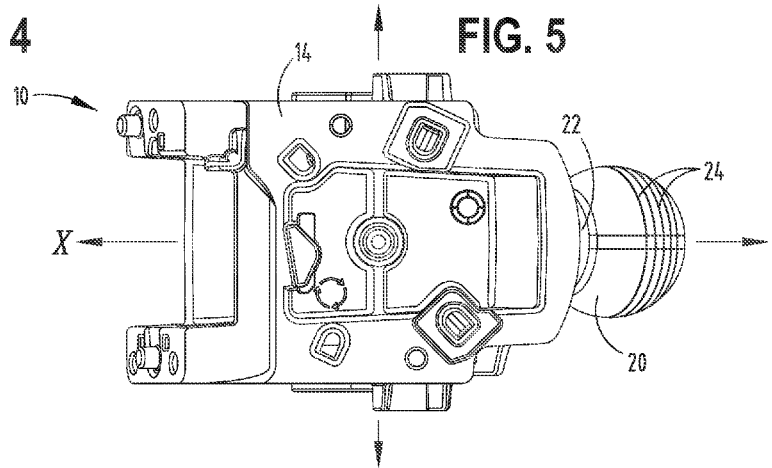
FIG. 6 is a top plan view of the windshield mounting portion of the mounting assembly of FIG. 1.
Figure 7:
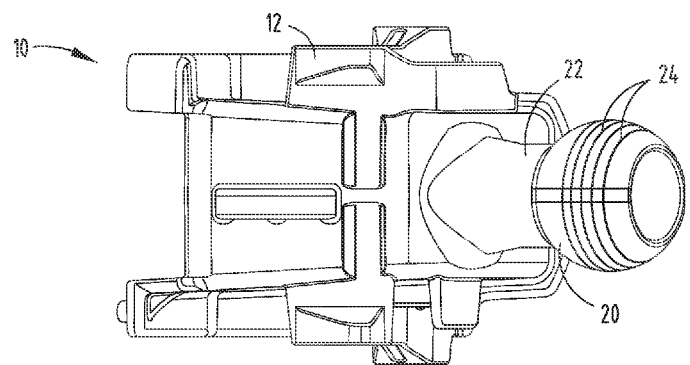
FIG. 7 is a bottom plan view of the neck and ball of the mounting assembly of FIG. 1.
Figure 8:
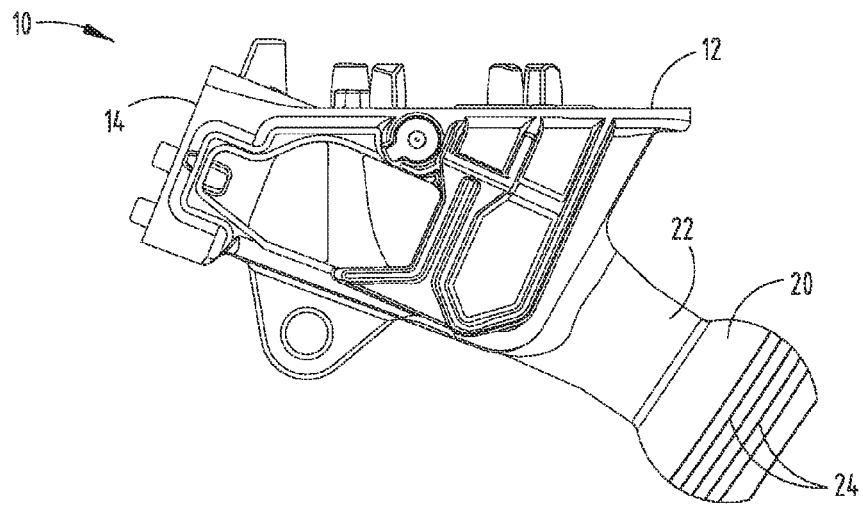
FIG. 8 is a first side elevation view of the mounting assembly of FIG. 1.
Figure 9:
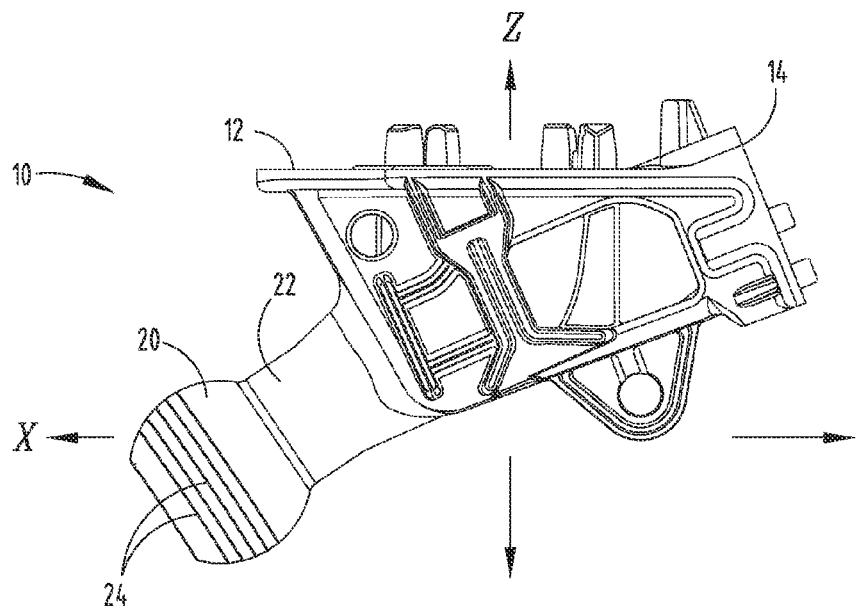
FIG. 9 is a second side elevation view of the mounting assembly of FIG. 1.
Figure 10:
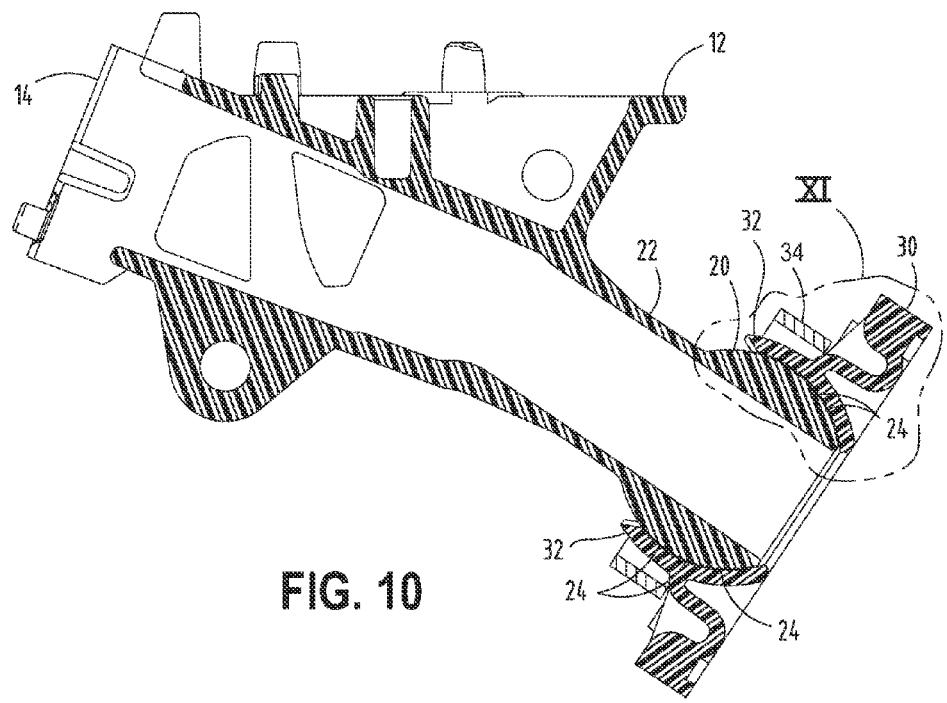
FIG. 10 is a side cross-sectional elevation view of the mounting assembly of FIG. 1.
Figure 11:
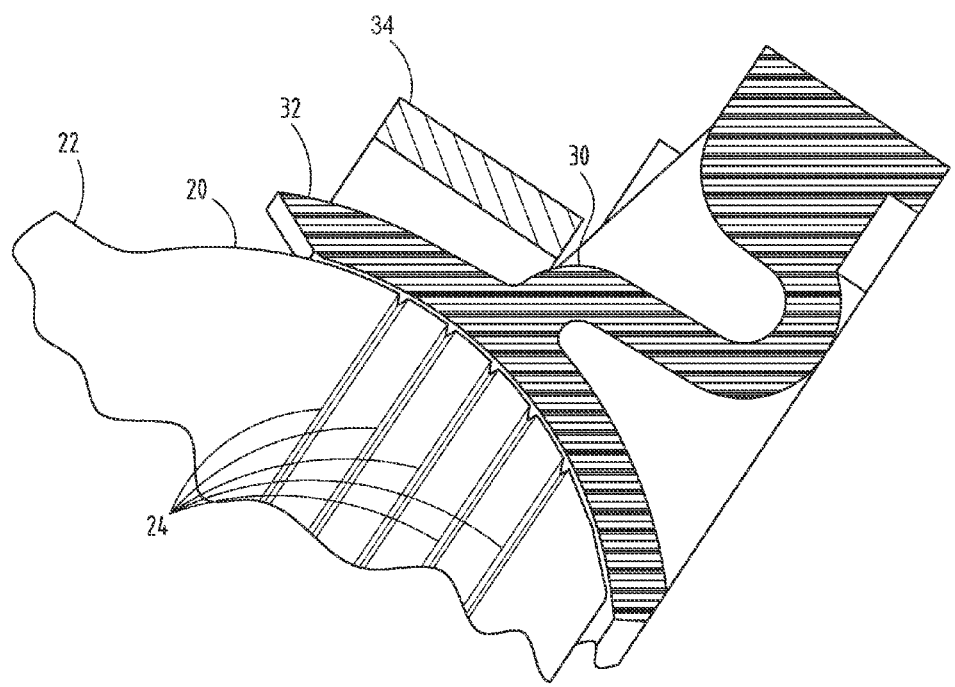
FIG. 11 is a partial enlarged side cross-sectional elevation view of the ball and socket engagement of FIG. 1.
Figure 12:
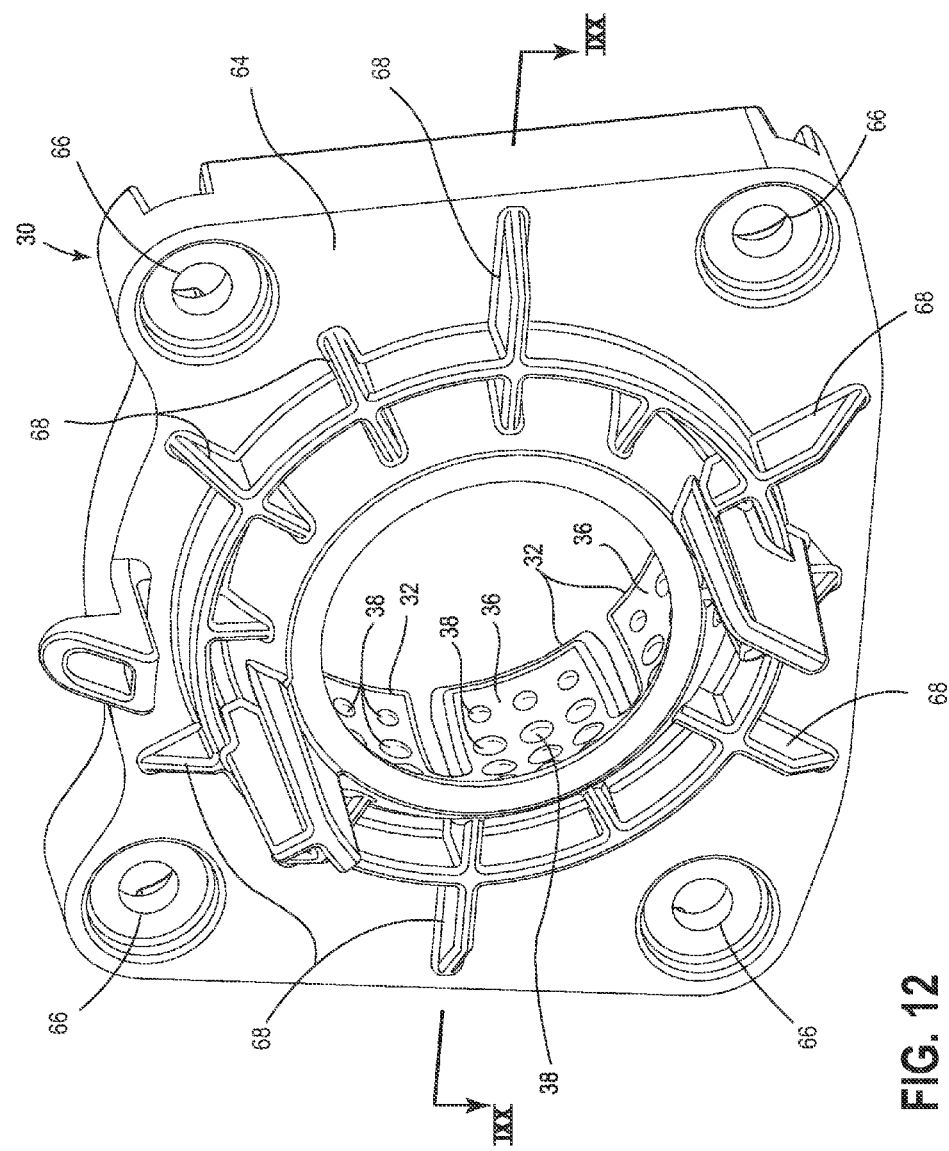
FIG. 12 is a front perspective view of one embodiment of a socket portion of a mounting assembly of a rearview device.
Figure 13:
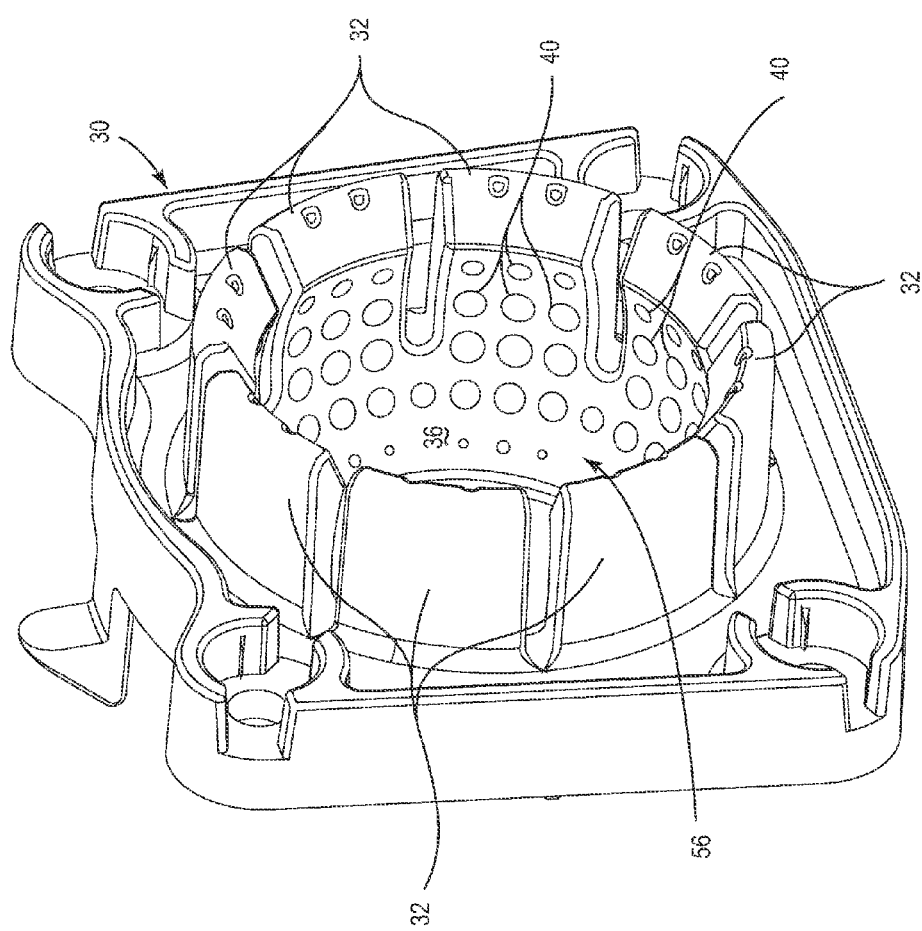
FIG. 13 is a rear perspective view of the socket of FIG. 12.
Figure 14:
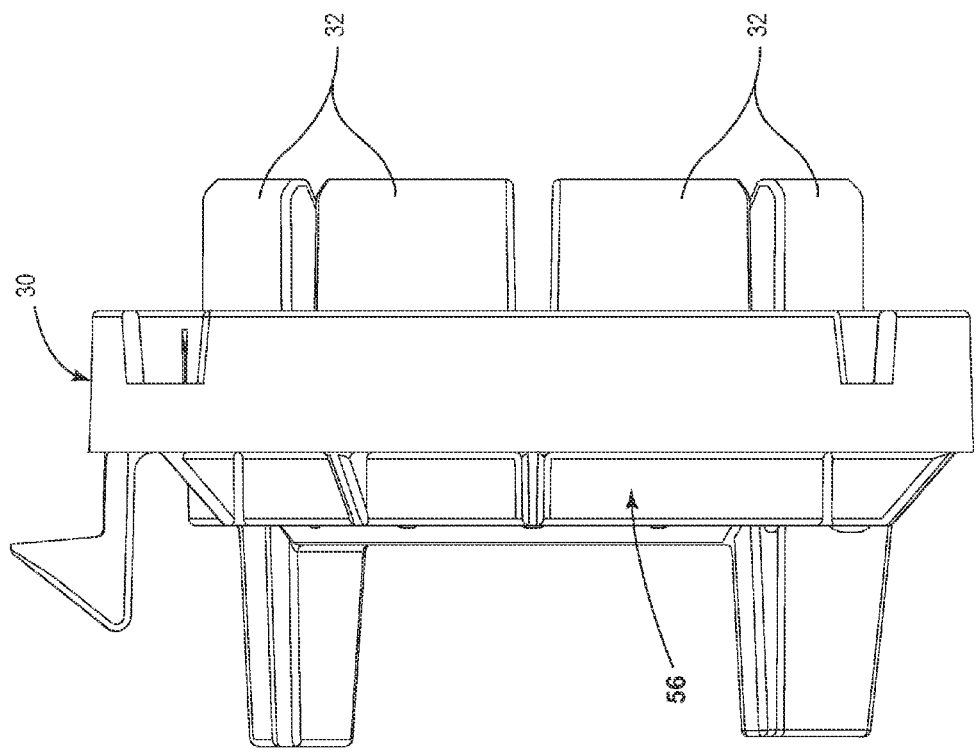
FIG. 14 is a side elevation view of the socket of FIG. 12.
Figure 15:
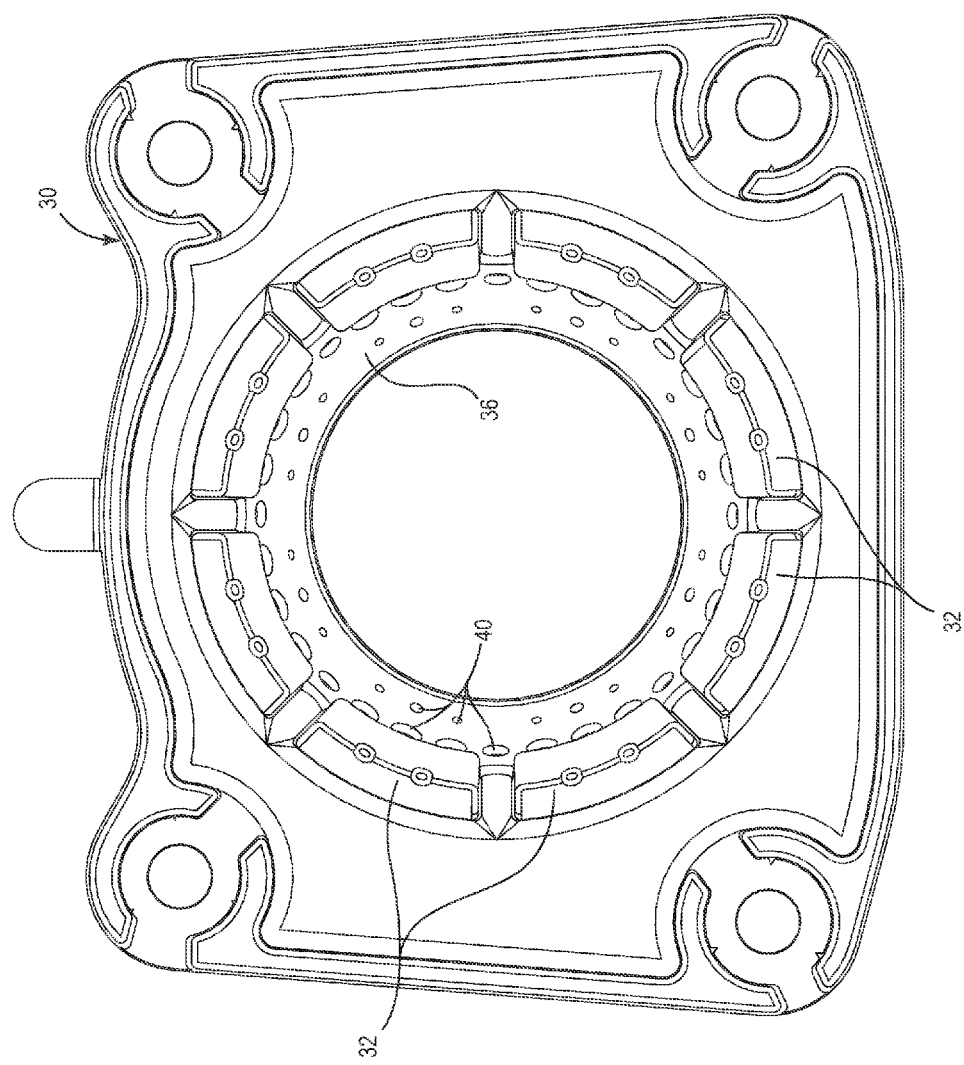
FIG. 15 is a rear elevation view of the socket of FIG. 12.
Figure 16:
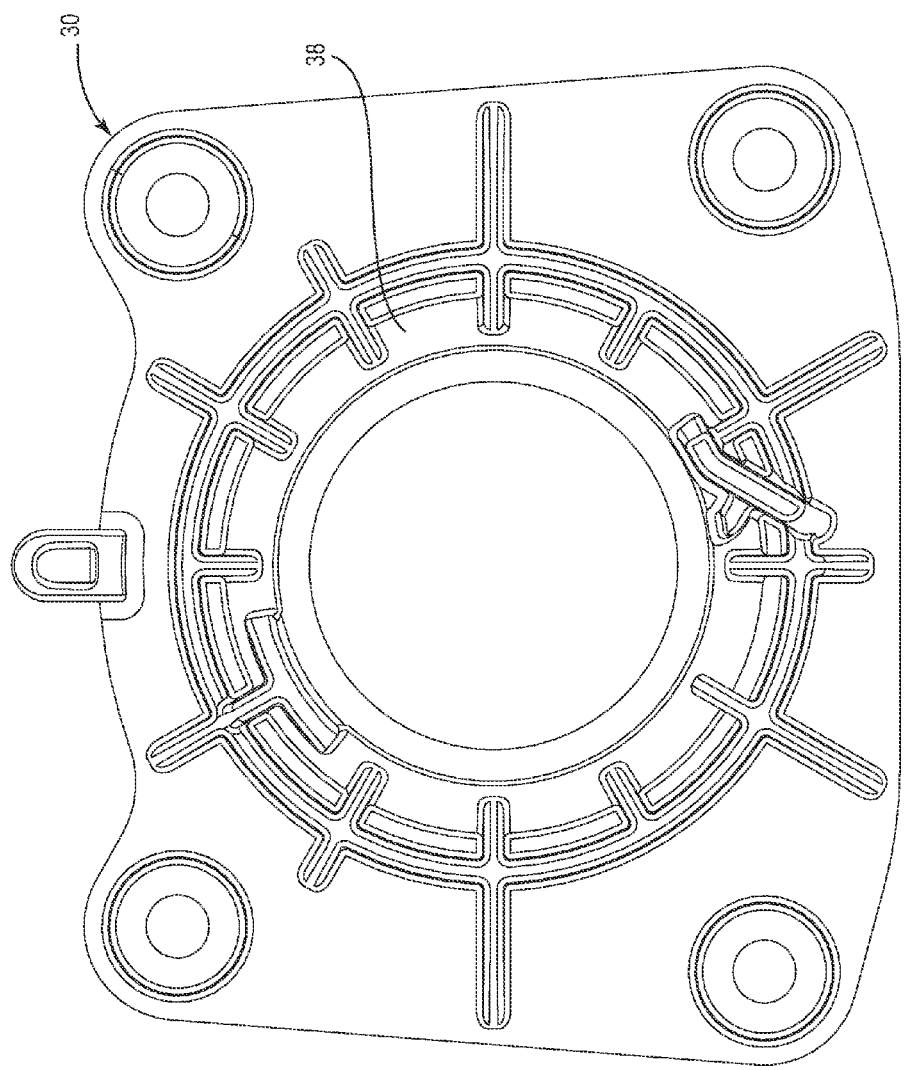
FIG. 16 is a front elevation view of the socket of FIG. 12.
Figure 17:
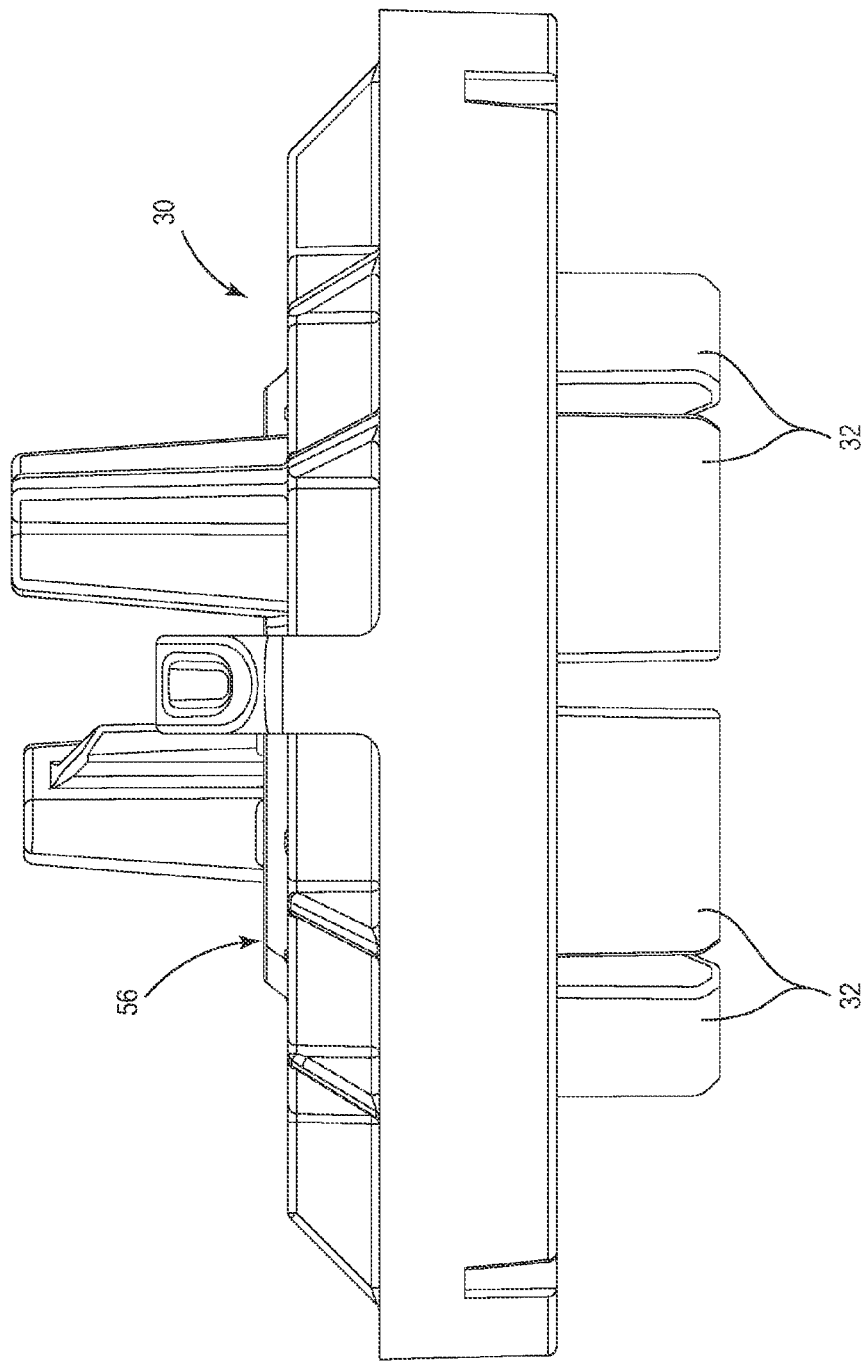
FIG. 17 is a top plan view of the socket of FIG. 12.
Figure 18:
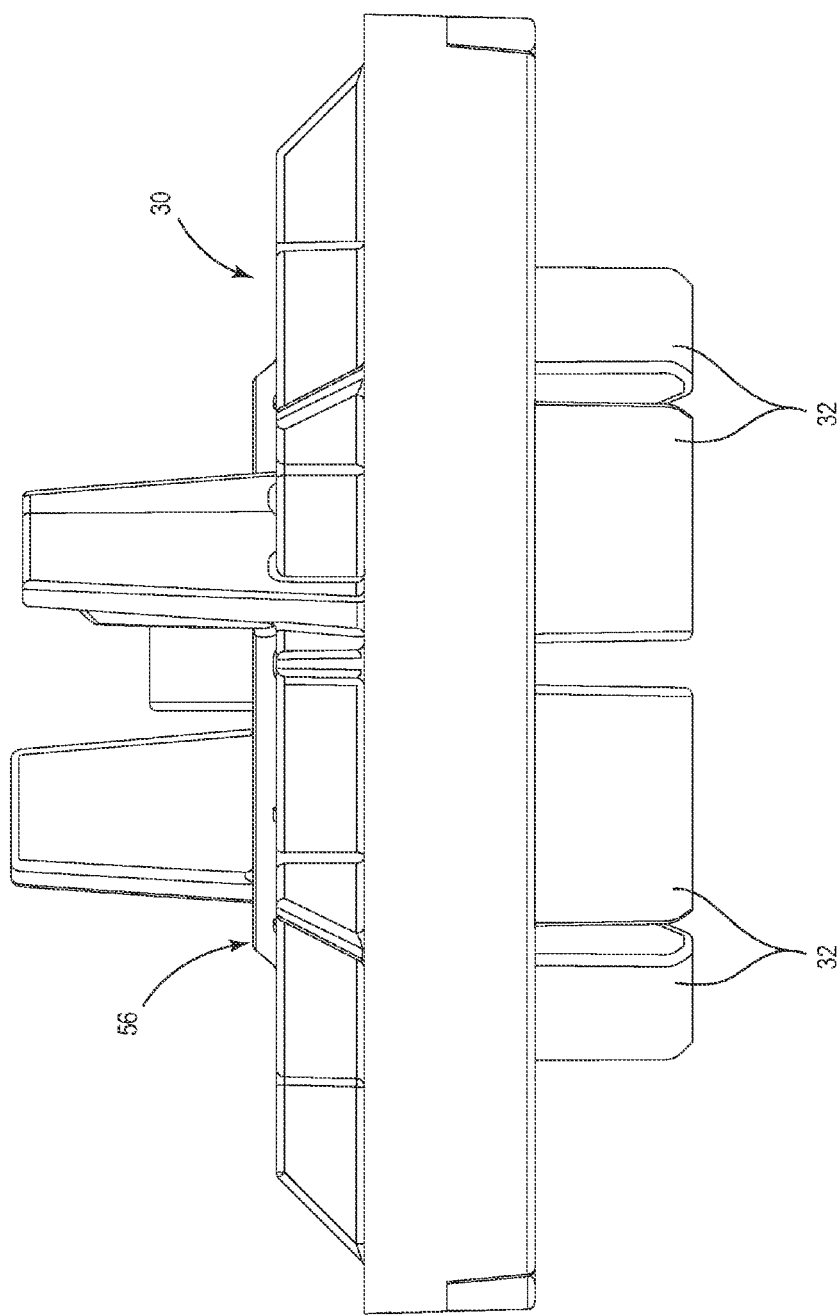
FIG. 18 is a bottom plan view of the socket of FIG. 12.
Figure 19:
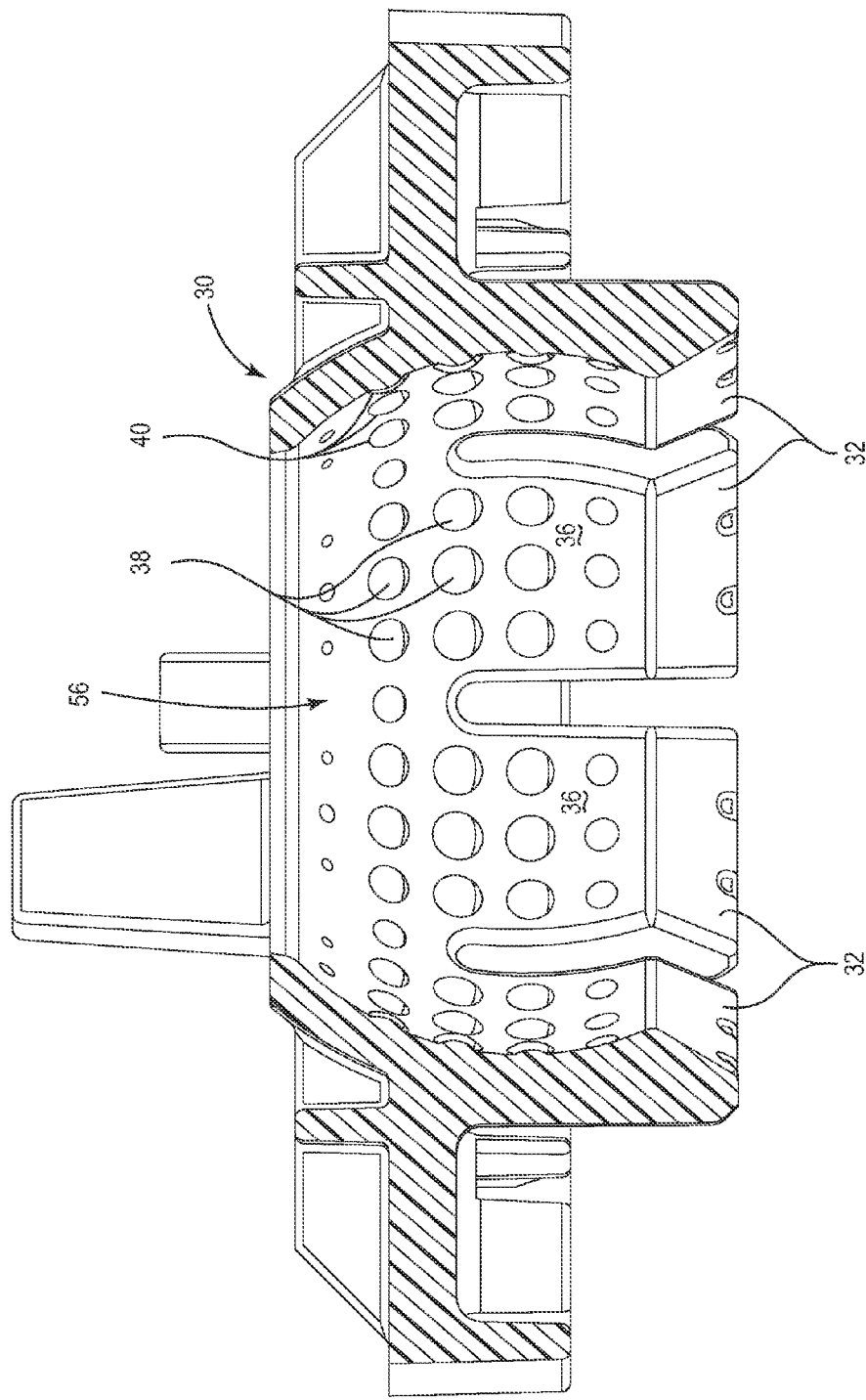
FIG. 19 is a bottom cross-sectional plan view of the socket of FIG. 12.

This invention is a solution to the common problem of interior rearview mirror or rearview device drooping. Generally referring to FIGS. 6 and 9, with regard to the present concept, it will be understood by a person having ordinary skill in the art that the Y axis (FIG. 6) extends across the mount (cross-car), the X axis (FIG. 6) extends forward and rearward through the mount (parallel with the length of the car), and the Z axis (FIG. 9) extends vertically through the mount. Drooping generally occurs during natural thermodynamic cycles or in response to dynamic forces, such as going over bumpy roads, and causes the rearview mirror to rotate about the y axis. Consumers then have the task of readjusting the rearview mirror every time drooping occurs. Even a 1 degree droop can be noticeable to a user when the vehicle has a very small windscreen and would require adjustment. Additionally, this invention minimizes drooping without increasing torque.

Referring to FIGS. 1-11, reference numeral 10 generally designates a rearview device mounting assembly having a bracket 12 including a windshield engagement surface 14. The bracket includes a ball 20 attached to a neck 22. The ball 20 includes striations or grooves 24 and is configured to slide into secure engagement with a socket 30 of a rearview device.

Referring again to FIGS. 1-11, the windshield engagement surface 14 of the rearview device mounting assembly 10 is generally configured for secure connection with an interior side of a windshield of a vehicle. The bracket 12 also includes a neck 22 with a ball 20. In one embodiment, the neck 22 and ball 20 have a nearly horizontal axis. Other embodiments may include the neck 22 and ball 20 pointed towards the driver or any other direction.

The ball 20 includes at least one striation 24. In one embodiment, the striations 24 are parallel to the equator of the ball 20. The striations 24 are generally in the YZ plane and prevent downward rotation or droop of an interior rearview device.

These striations 24 are configured to engage one or more multiple fingerlike projections 32 on a standard socket receiver 30 disposed in a rearview device. Specifically, at least one fingerlike projection 32 extends from the socket 30 and frictionally engages a striation 24 on the ball 20. The projections 32 prevent the ball 20 from drooping. Unlike traditional systems, the present invention minimizes droop without increasing torque. More specifically, one of the projections 32 catches on the striation 24 proximate a top portion or a bottom portion of the ball 20. A spring band 34 secures the ball 20 inside the socket 30. Alternatively, a coil spring may be used to secure the ball 20 inside the socket 30.

The striations 24 may include one or more shaped grooves. In one embodiment, the depth of the grooves or striations 24 ranges from 0.15 mm to 0.5 mm and are drilled prior to powder coating the rearview device mounting assembly 10. This depth of striation 24 will allow a less than 0.4-0.5 degree droop over 10 thermodynamic cycles. The shaped grooves can be triangular, square, circular, etc. As previously mentioned, the grooves are generally configured to improve or eliminate static droop introduced through thermodynamic cycles without increasing the torque and to improve or eliminate dynamic droop, which may occur when traveling over a rough surface, such as bumpy roads or railroad tracks. The striations 24 generally define a rotational texture that results in increased frictional resistance of the socket fingers on the ball 20. As illustrated in FIG. 3C and FIG. 3D, the striations 24 may be in the form of continuous circular grooves, or only partial grooves on a top and bottom area of the ball 20. In another embodiment, the striations 24 are generally defined as microgrooves that do not impact the adjustment force required by a user to adjust the rearview device, but result in the rearview device maintaining a position on the ball 20 with less than 0.1 to 0.3 degree droop.

Figure 3A:
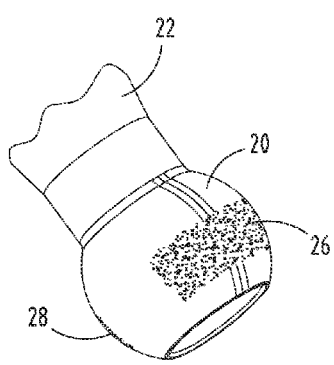
FIG. 3A is a top perspective view of another embodiment of a ball portion for use in a mounting assembly.
Figure 3B:
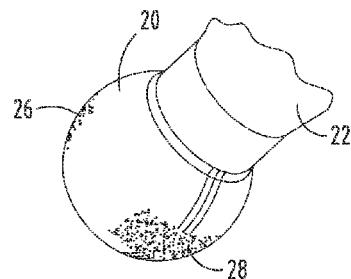
FIG. 3B is a bottom perspective view of the embodiment shown in FIG. 3A.
Figure 3C:
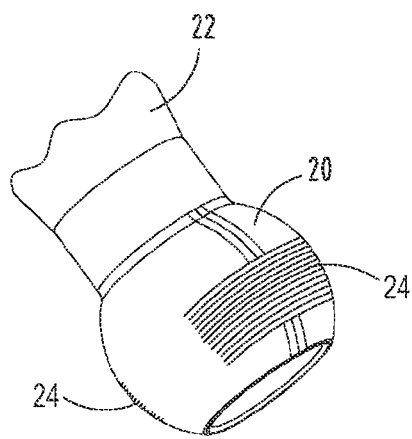
FIG. 3C is a top perspective view of another embodiment of a ball portion for use in a mounting assembly.
Figure 3D:
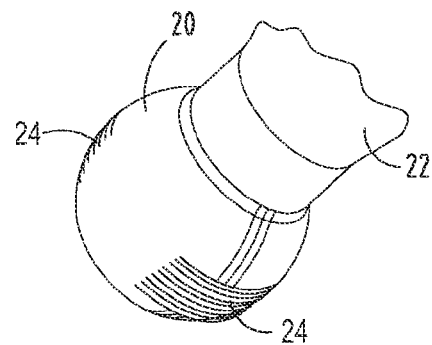
FIG. 3D is a bottom perspective view of the embodiment shown in FIG. 3C.
Figures 4, 5:
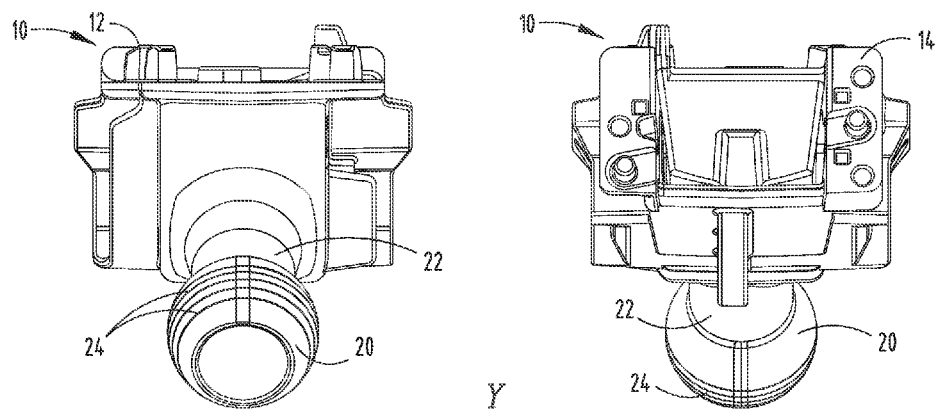
FIG. 4 is a front elevation view of the mounting assembly of FIG. 1.
FIG. 5 is a rear elevation view of the mounting assembly of FIG. 1.

In yet another embodiment, as shown in FIG. 3A and FIG. 3B, knurled patches 26, 28 are supplied as a textured pattern above and possibly below the ball 20. The knurled patches 26, 28 provide a similar function to the striations 24 and minimize droop during thermodynamic cycles and in response to dynamic forces. The use of the knurled patches 26, 28 takes the place of traditional practices of roughing the ball 20 in the socket, including scuffing.

Referring now to FIGS. 12-31, to improve or eliminate droop without increasing the torque, at least a portion of an engagement surface 36 of the socket 30 is textured with raised features 38, to frictionally engage the ball 20. A socket 30 having raised features 38 can be used whether ball 20 includes striations 24, knurled patches 26, 28, or is a standard smooth-surfaced ball 20.

As shown in the embodiment depicted in FIGS. 12-19, the raised features 38 may include a plurality of raised rounded bumps 40. The raised bumps 40 may cover the entire engagement surface 36 of the socket, or may cover only a portion thereof. The raised bumps 40 may be evenly distributed along the engagement surface 36, or may be concentrated to particular portions of the engagement surface 36.

Alternatively, as shown in the embodiments depicted in FIGS. 20-28, raised features 38 may be provided in the form of crosses 42, with arms 44 of varying length and shape. The arms 44 generally extend parallel to the direction of entry of the ball 20 into the socket 30 and perpendicular to the direction of entry of the ball 20 into the socket 30. As with the rounded bumps 40, the crosses 42 may be evenly distributed about the engagement surface 36, or may be concentrated to particular portions of the engagement surface. For example, the crosses 42 may be present on each fingerlike projection 32, or may be provided on only some of the fingerlike projections 32.

Figure 20:
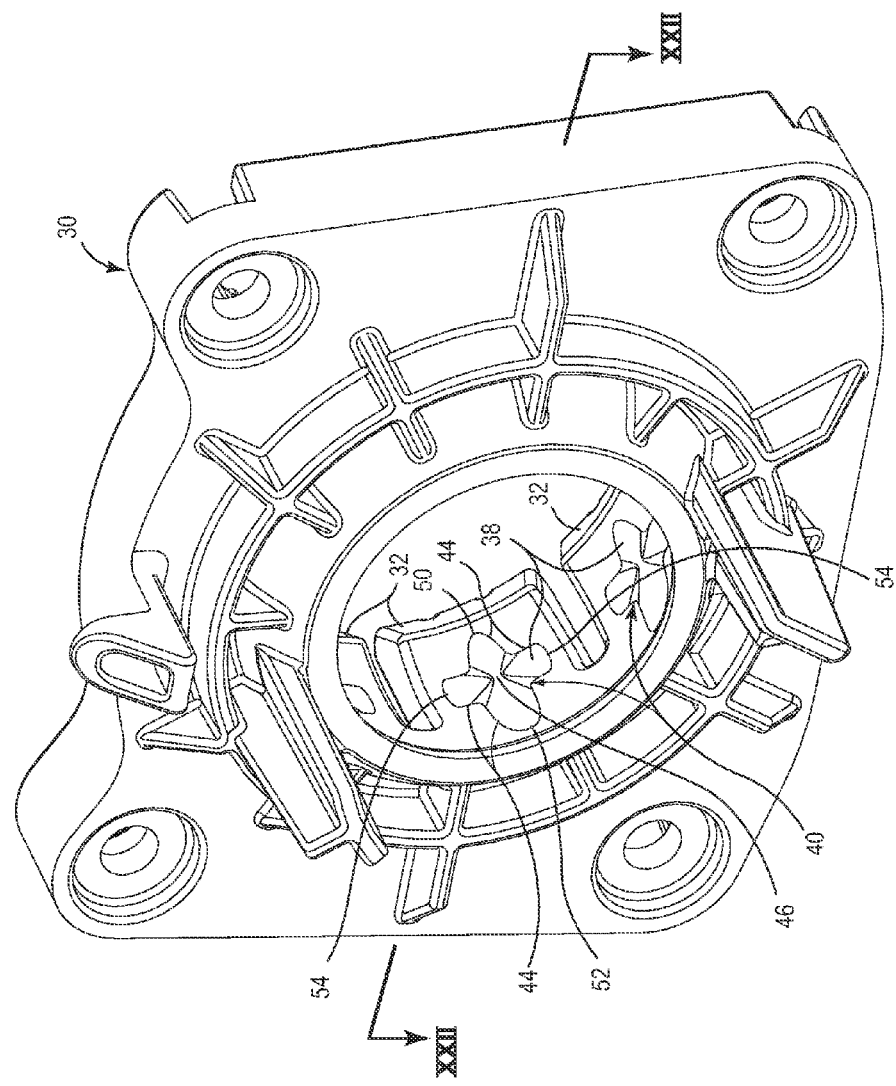
FIG. 20 is a front perspective view of another embodiment of a socket portion of a mounting assembly of a rearview device.
Figure 21:
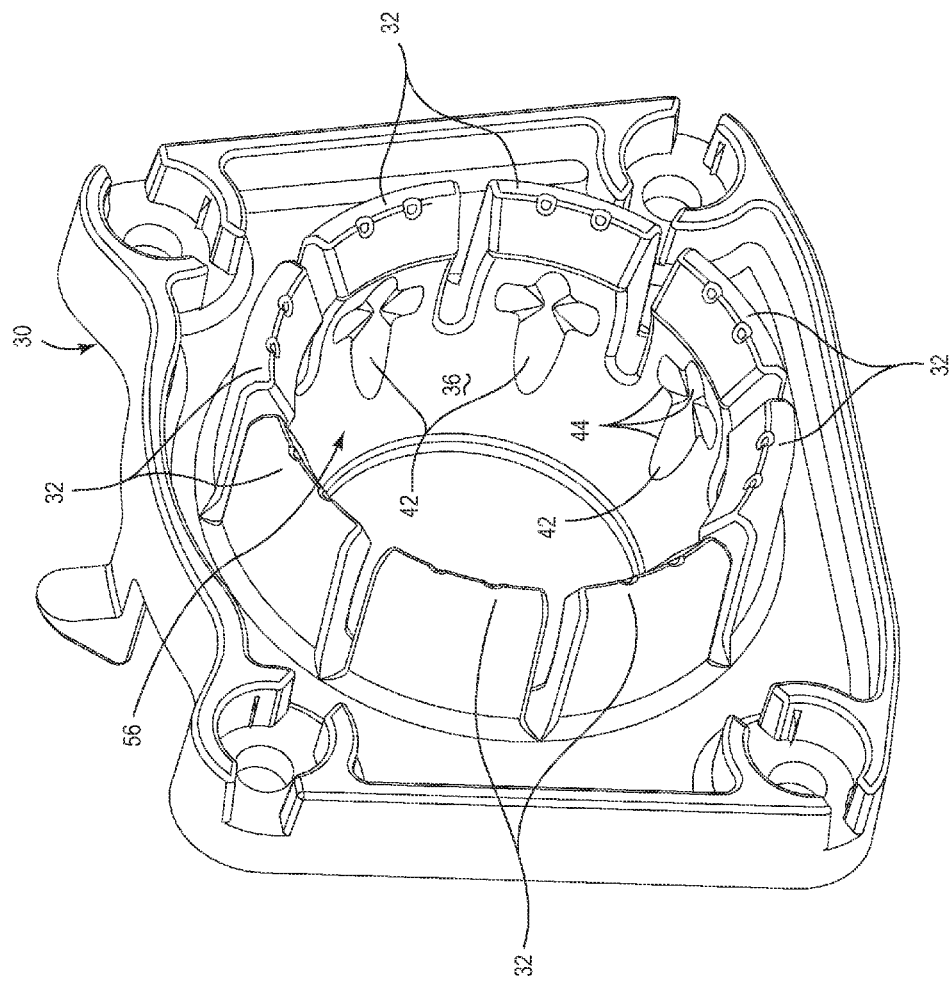
FIG. 21 is a rear perspective view of the socket of FIG. 20.
Figure 22:
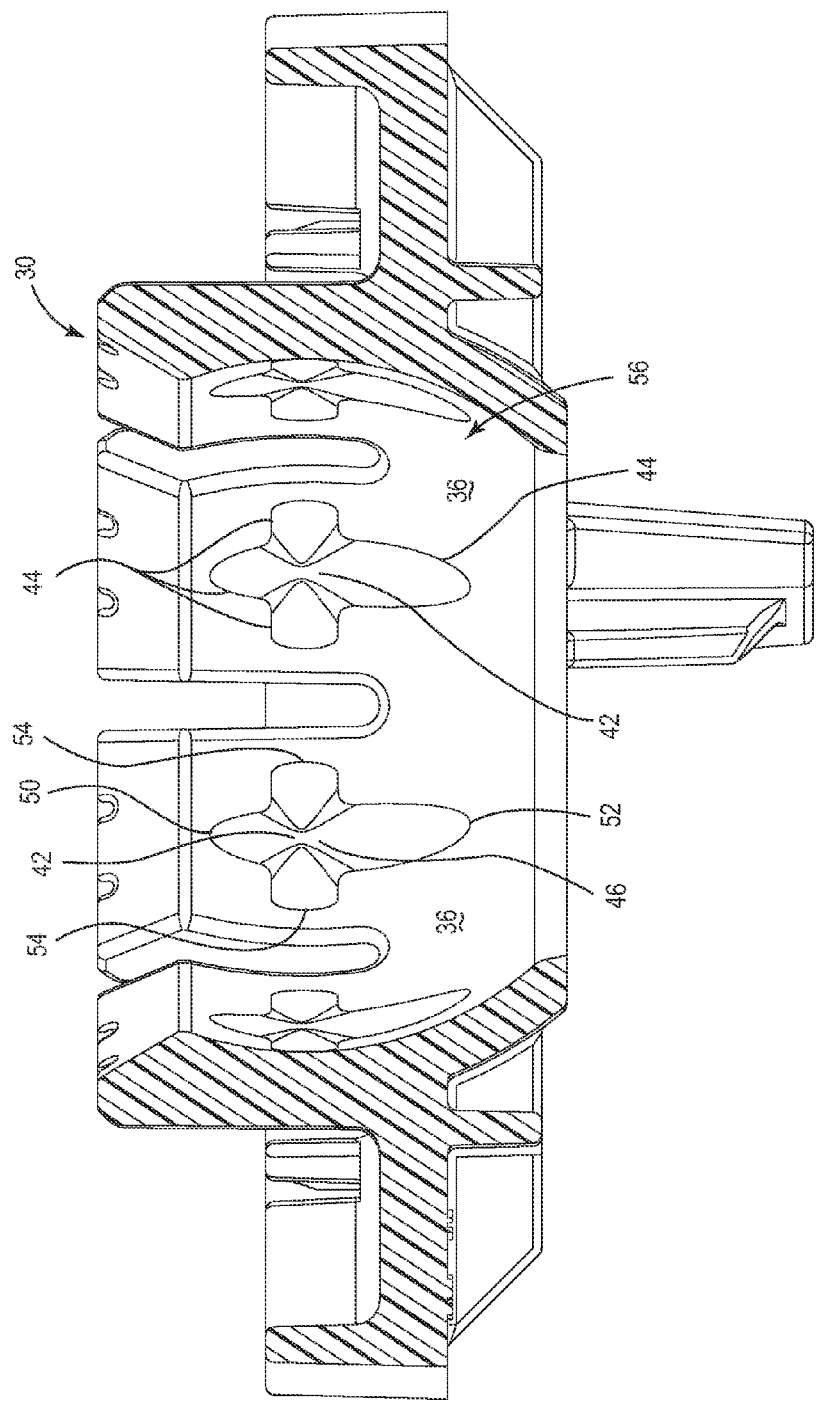
FIG. 22 is a top cross-sectional plan view of the socket of FIG. 20.

As shown in FIGS. 20-22, the cross 42 is generally centered on the engagement surface 36 of the fingerlike projection 32. The cross 42 includes four arms 44, which meet in the center 46 of the cross 42. The center 46 of the cross 42 is the portion which is raised off of the engagement surface 36 the greatest amount. The first arm 50 which extends toward a distal end of the fingerlike projection 32 has a rounded distal end which tapers toward the engagement surface 36. The second arm 52, which extends oppositely the first arm 50, also has a rounded distal end which tapers toward the engagement surface 36. The second arm 52 has a length (from the center 46 to the distal end) which is greater than the length of the first arm 50. The side arms 54 of the cross 42 extend generally perpendicularly to the first and second arms 50, 52. The side arms 54 shown in FIGS. 20-22 extend away from the center 46 of the cross 42, and the distal ends of the side arms 54 have a generally squared off shape. The side arms 54 have a length which is less than the second arm 52, and they do not taper toward the engagement surface 36 along their length as the first and second arms 50, 52 do. The first arm 50 and the side arms 54 do not extend to the exterior edges of the fingerlike projection 32. The second arm 52 extends beyond the fingerlike projection 32 into a receiving portion 56 of the socket.

Figure 23:
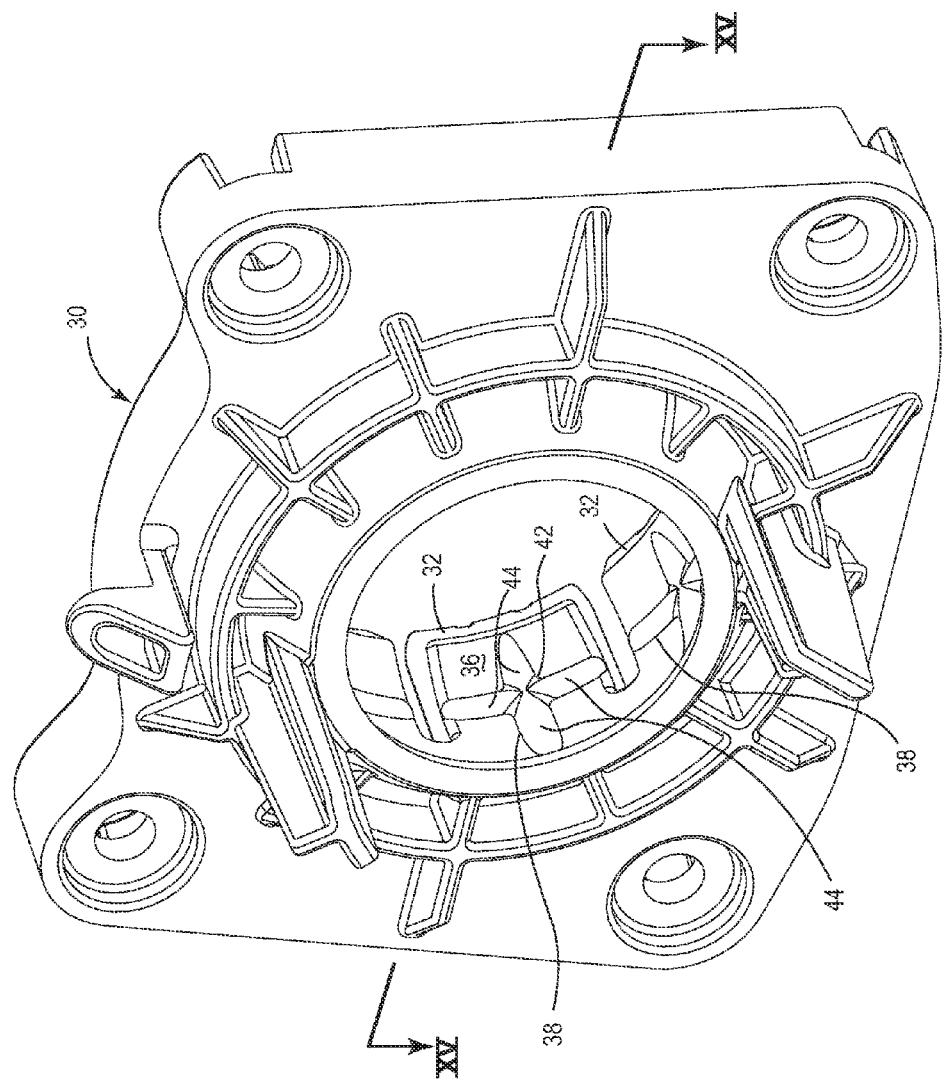
FIG. 23 is a front perspective view of another embodiment of a socket portion of a mounting assembly of a rearview device.
Figure 24:
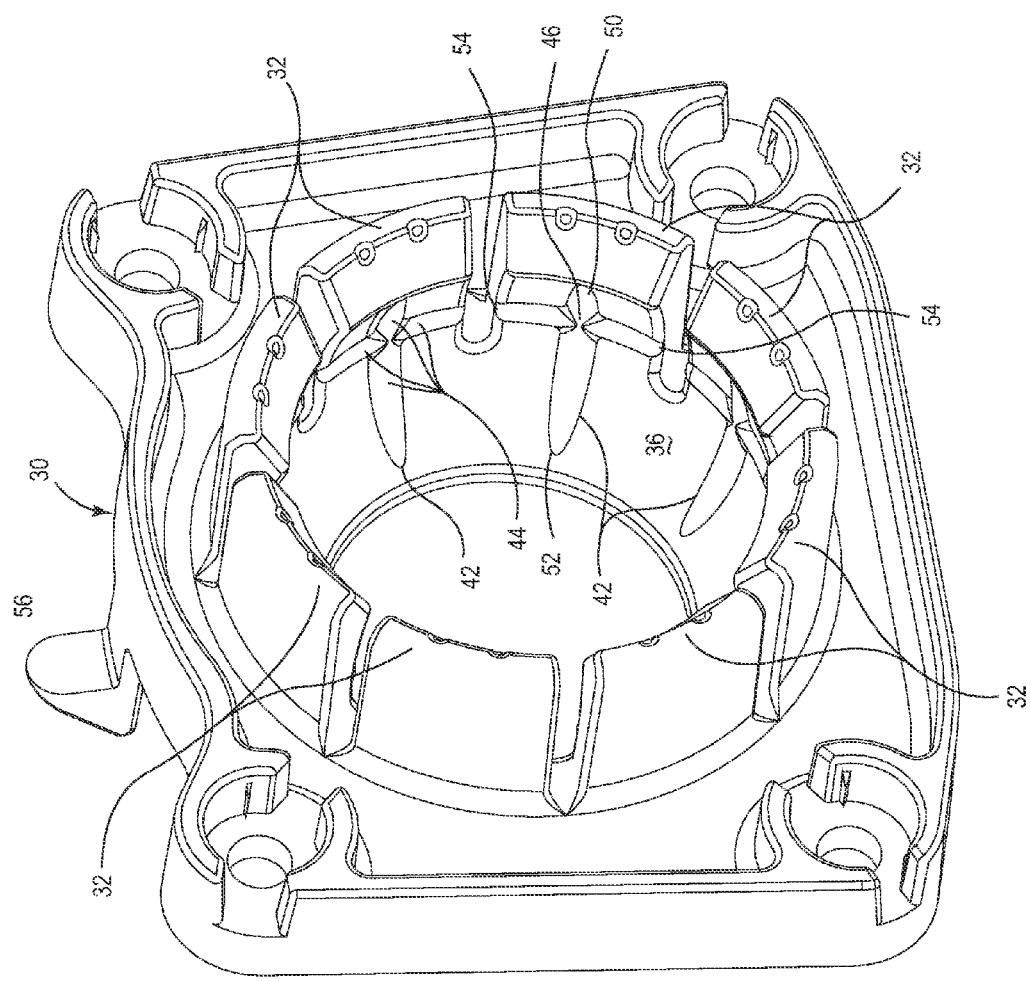
FIG. 24 is a rear perspective view of the socket of FIG. 23.
Figure 25:
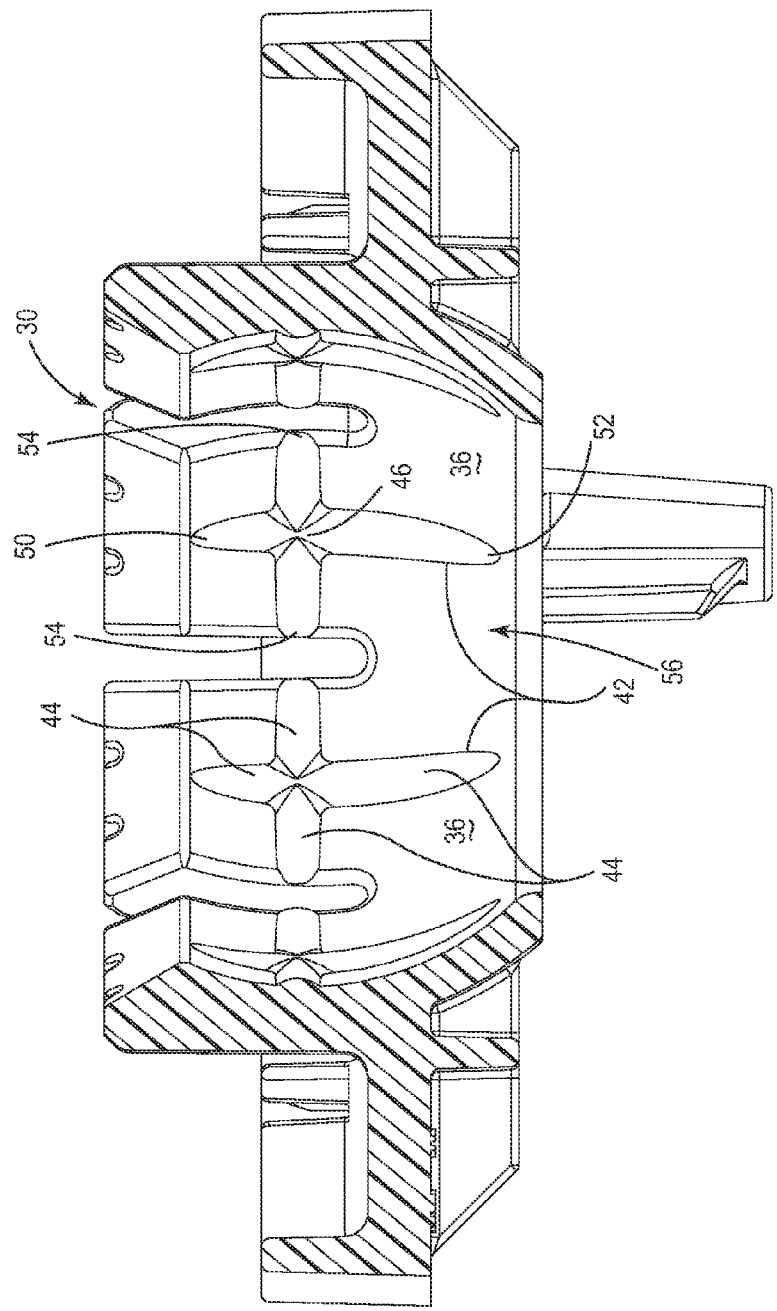
FIG. 25 is a top cross-sectional plan view of the socket of FIG. 23.

As shown in the embodiments depicted in FIGS. 23-25, the cross 42 is generally centered on the engagement surface 36 of the fingerlike projection 32. The cross 42 also includes four arms 44, and a center 46. The four arms 44 radiate out from the center 46, with the first arm 50 extending toward the distal end of the fingerlike projection, the second arm 52 extending toward the proximal end of the engagement surface, and the side arms 54 extending generally perpendicularly from the first arm 52 and the second arm 52. The embodiment of the crosses 42 depicted in FIGS. 23-25 are also raised from the engagement surface 36 the most significantly at the center 46 of the cross 44, and taper down toward the distal end of the legs 50, 52. The cross 42 shown in FIGS. 23-25 includes a first arm 50 and side arms 54 which extend to the edges of the fingerlike projection 32 on which the cross 42 is centered.

Figure 26:
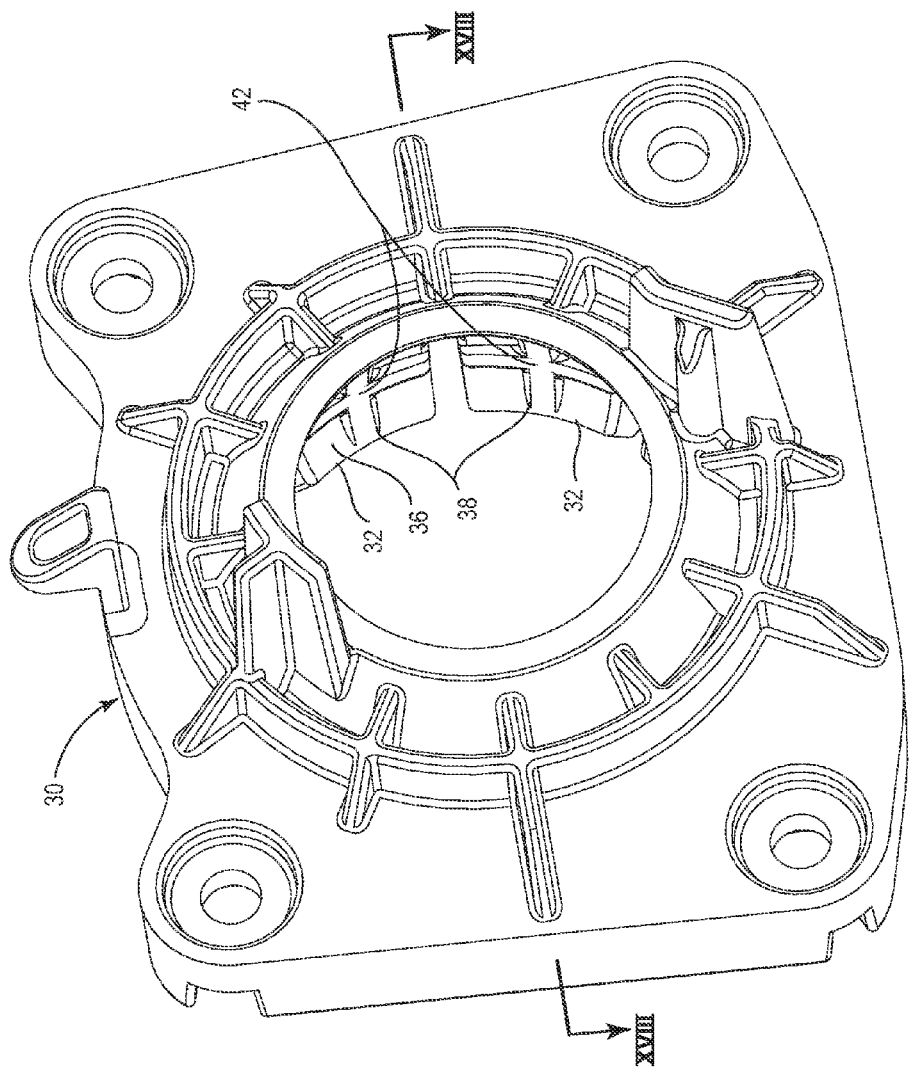
FIG. 26 is a front perspective view of another embodiment of a socket portion of a mounting assembly of a rearview device.
Figure 27:
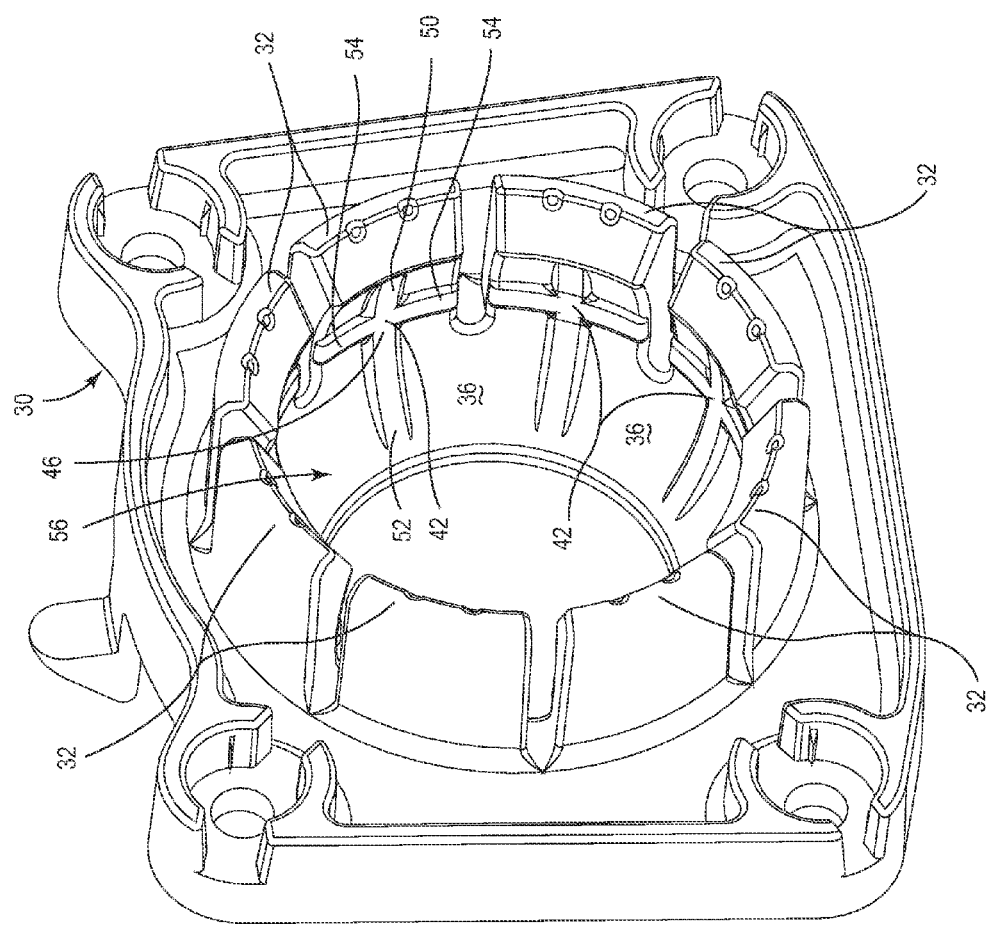
FIG. 27 is a rear perspective view of the socket of FIG. 26.
Figure 28:
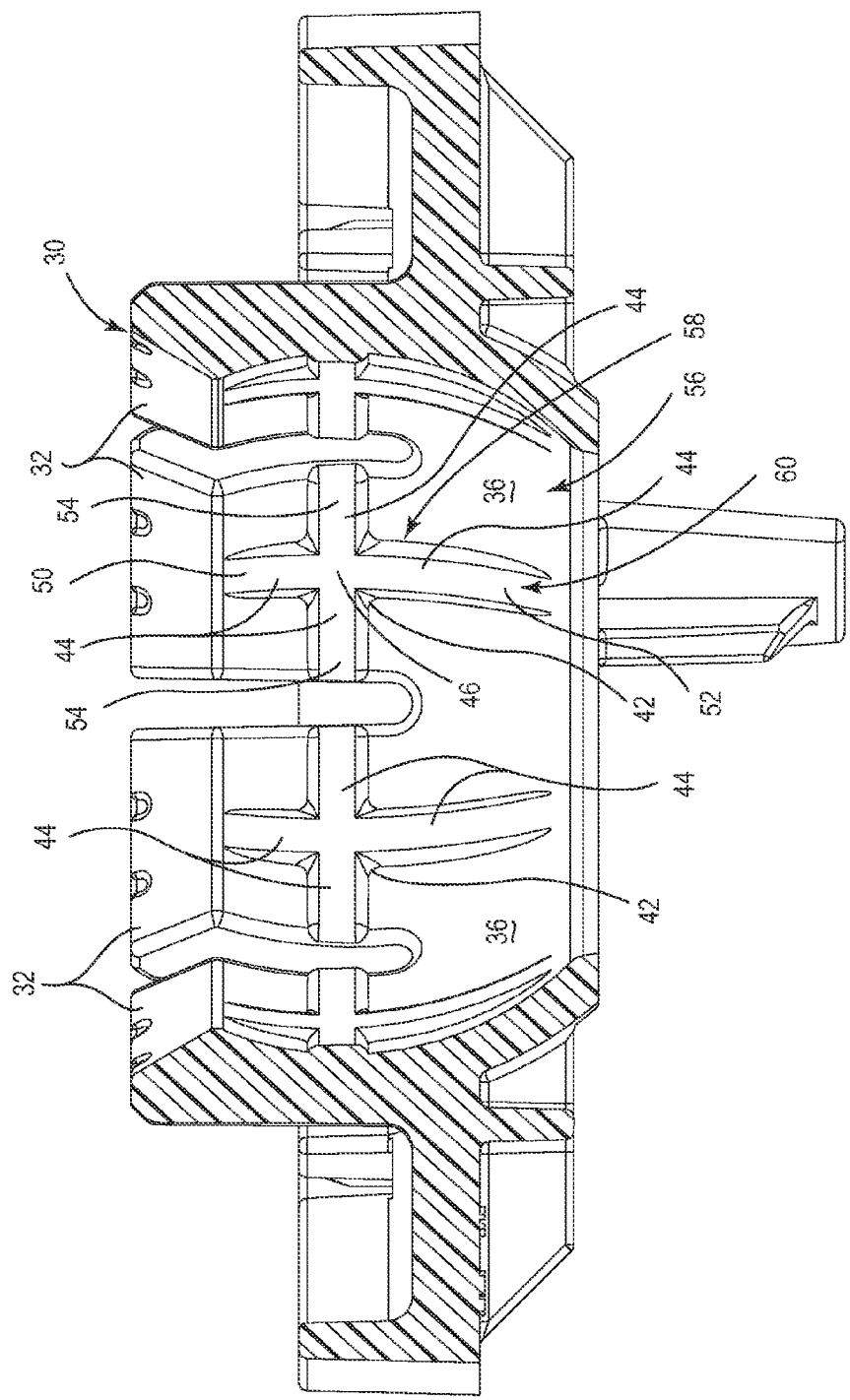
FIG. 28 is a top cross-sectional plan view of the socket of FIG. 26.

As shown in the embodiment depicted in FIGS. 26-28, the cross 42 is generally centered on the engagement surface 36 of the fingerlike projections 32. The cross 42, as with the previous embodiments disclosed herein, includes four arms 44, which meet in the center 46. The first arm 50 and the side arms 54 extend toward the edges of the fingerlike projection 32 on which the cross is centered, and the second arm 52 extends from the fingerlike projection 32 to the receiving portion 56 of the socket 30. The arms 44 of the cross 42 have squared-off distal ends. The edges 58 of the cross 42 are tapered to a flat top surface 60. The flat top surface 60 of the cross 42 is raised a generally uniform amount with respect to the engagement surface 36, with the arms of the cross 44 having the same height as the center 46 of the cross 42. Alternatively, the flat top surface 60 may taper to the distal and proximal ends of the fingerlike projections 32 from the center 46 of the cross 42.

The raised features 38 in the embodiments depicted in FIGS. 19-25 have a generally rounded cross sectional shape, in contrast with the flat top surface 60 of the cross 42.

Figure 29:
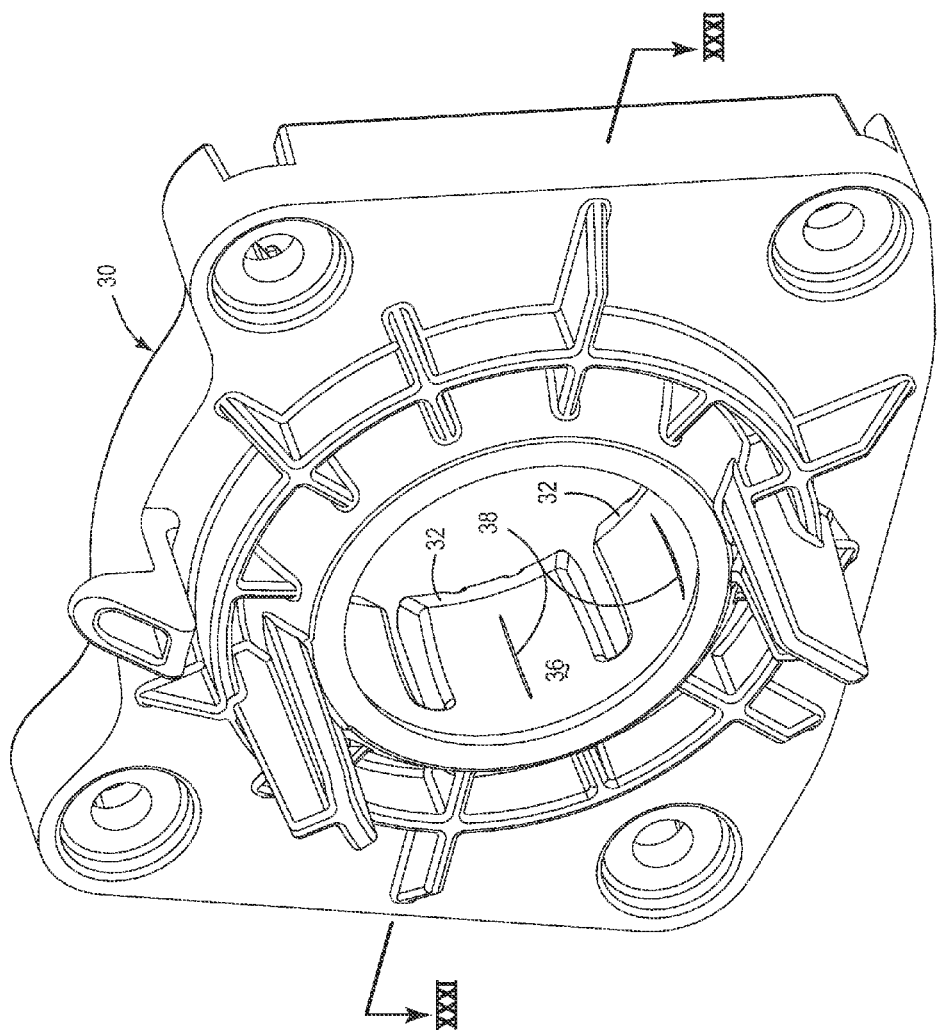
FIG. 29 is a front perspective view of another embodiment of a socket portion of a mounting assembly of a rearview device.
Figure 30:
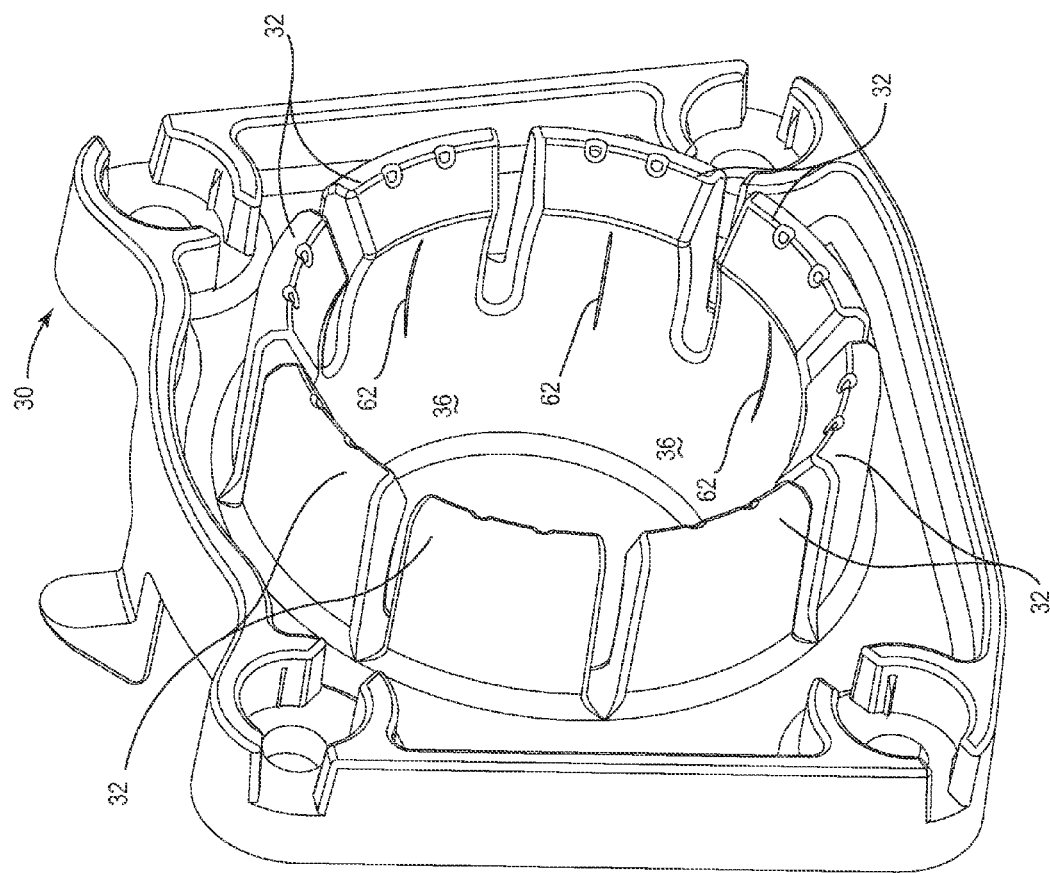
FIG. 30 is a rear perspective view of the socket of FIG. 29.
Figure 31:
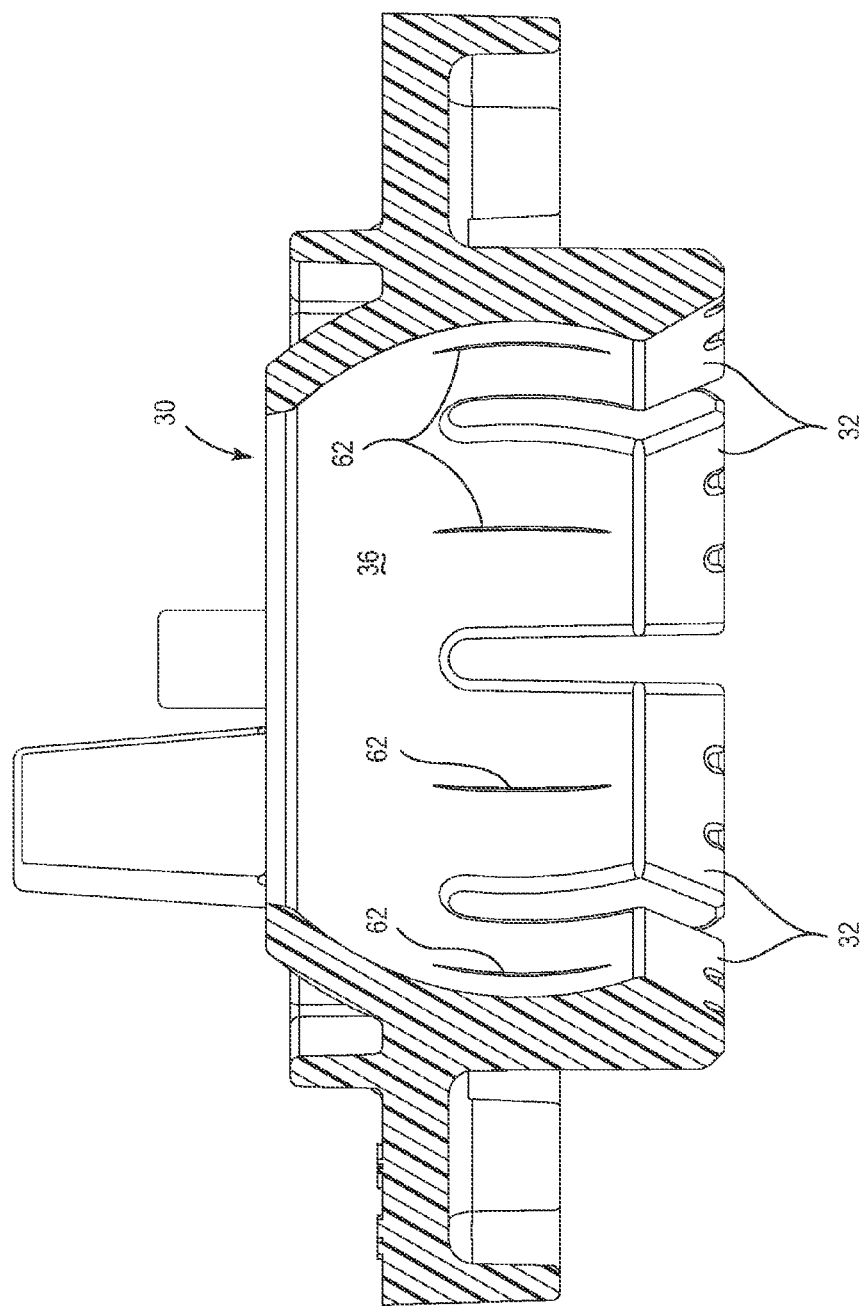
FIG. 31 is a top cross-sectional plan view of the socket of FIG. 29.

Additionally, as shown in the embodiment depicted in FIGS. 29-31, the raised feature may include a thin rib 62. The thin rib 62 extends from the interior surface 36 of the fingerlike projections 32 and is directed generally parallel to the direction of entry of the ball 20 into socket 30.

The raised features 38 may be round, as shown in FIGS. 12-19, generally cross-shaped as shown in FIGS. 20-28, or rib-shaped as shown in FIGS. 29-31. The raised features 38 may also be, without limitation, oblong, oval, elliptical, rectangular, square, trapezoidal, hexagonal, octagonal, amoeba-like, or any other regular or irregular shape, with rounded corner portions or sharp corners. The raised features 38 may also have a rounded top surface or a flattened top surface.

The socket 30 includes the fingerlike projections 32 extending rearwardly (when oriented as shown in FIG. 1) and the receiving portion 56 which is disposed forwardly from the fingerlike projections 32. In use, the ball 20 is inserted from the direction of the fingerlike projections 32, toward the receiving portion 56, until the ball 20 is seated against the receiving portion 56. After placing the ball 20 against the receiving portion 56 of the socket 30, the spring band 34 is placed over the fingerlike projections 32. The spring band 34 holds the fingerlike projections 32 in close engagement with the ball 20, and allows the distal end of the fingerlike projections 32 to form an opening which has a circumference less than the circumference of the ball 20, thereby retaining ball 20 against the receiving portion 56.

The raised features 38 engage with the ball 20, limiting the droop of the ball 20 in the socket 30.

The socket 30 may be built into the rearview device, or may be a separate member that is attached to the rearview device or otherwise used to affix the rearview device to a vehicle windshield. As shown in FIGS. 12-31, the socket 30 is a provided as a separate body 64 which can be affixed to the rearview device. Screw holes 66 are provided in the body 64, permitting secure attachment to the rearview device.

The fingerlike projections 32 extend rearwardly from the body 64 and the receiving portion 56 extends forwardly from the body 64. To provide structural support for the receiving portion 56, supporting members 68 are arranged around the circumference of the receiving portion 56.

The interface between the ball 20 and the socket 30 described herein, and the texturing of one or both of the surfaces of the ball 20 or the engagement surface 36 of the socket 30, reduces the amount of static thermal droop and dynamic droop introduced to the rearview device mounting assembly 10. The use of the textured ball 20 or engagement surface 36 may also be used to equalize the resistance to rotation about any axes through the rearview device mounting assembly 10. Commonly, the torque required to rotate a display mirror about the Z-axis is higher than the torque required to rotate the display mirror around the X- and Y-axes. This variation in torque requirements is because all of the fingerlike projections 32 (generally eight fingerlike projections 32 per socket 30) are engaged in the movement about the Z-axis, whereas rotation about the other axes involves only some of the fingerlike projections 32 (generally four when the socket 30 includes eight fingerlike projections 32).

The texturing of the surface of the ball 20, the engagement surface 36 of the socket 30, or both, may also aid in increasing the force required to rotate the ball 20 in any permissible direction within the socket 30. As rearview displays become more complex, an increased number of wiring connections are required, and the wires feed through the ball 20 of the rearview device mounting assembly 10. As a larger number of wires are fed through the ball 20, the diameter of the ball 20 may need to be increased. Larger ball 20 diameters result in a lower force required to rotate the ball 20 in the socket 30. Therefore, the use of the textured surface of the ball 20, engagement surface 36 of the socket 30, or both, can compensate for the lower force required to rotate the larger ball 20 in the socket 30, and therefore eliminate or minimize the increased potential for drooping experienced as the diameter of the ball 20 is increased.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. A rearview device mounting assembly comprising:
   a mount;
   a neck extending from the mount and defining a central longitudinal axis, the neck including a ball on a distal end thereof;
   a plurality of grooves disposed on an outer circumference of the ball; and the plurality of grooves are discontinuous partial grooves on the top area and bottom area of the ball; and
   a generally smooth socket configured to closely receive the ball.

2. The rearview mounting device of claim 1, wherein the plurality of grooves are parallel to the equator of the ball.

3. The rearview mounting device of claim 2, wherein the depth of the plurality of grooves is from about 0.15 mm to about 0.5 mm.

4. The rearview mounting device of claim 2, wherein the cross-section of the plurality of grooves is triangular, square or circular.

5. The rearview mirror mounting device of claim 1, wherein the socket further comprises fingerlike projections which engage the plurality of grooves.

* * * * *

UNITED STATES PATENT AND TRADEMARK OFFICE
CERTIFICATE OF CORRECTION

| | | |
|---|---|---|
| PATENT NO. | : 8,960,629 B2 | Page 1 of 1 |
| APPLICATION NO. | : 13/800180 | |
| DATED | : February 24, 2015 | |
| INVENTOR(S) | : Rizk et al. | |

It is certified that error appears in the above-identified patent and that said Letters Patent is hereby corrected as shown below:

In the Claims,

Col. 7, claim 1, line 16;

"ball; and" should be --ball; wherein--.

Signed and Sealed this
Eighth Day of September, 2015

Michelle K. Lee
*Director of the United States Patent and Trademark Office*